(12) United States Patent
Li et al.

(10) Patent No.: US 7,764,728 B2
(45) Date of Patent: Jul. 27, 2010

(54) APPARATUS AND METHOD FOR REDUCING COMPLEXITY OF MATCHED FILTER

(75) Inventors: Sung-Chiao Li, Taipei (TW); Huoy Bing Lim, Fremont, CA (US); Ching-Chia Hsu, Taipei (TW); Yu-Lin Wang, Taipei (TW)

(73) Assignee: Via Technologies, Inc., Hsin-Tien, Taipei (TW)

( * ) Notice: Subject to any disclaimer, the term of this patent is extended or adjusted under 35 U.S.C. 154(b) by 952 days.

(21) Appl. No.: 11/550,577

(22) Filed: Oct. 18, 2006

(65) Prior Publication Data

US 2008/0095278 A1    Apr. 24, 2008

(51) Int. Cl.
*H04B 1/69* (2006.01)
*H04B 1/707* (2006.01)
*H04B 1/713* (2006.01)

(52) U.S. Cl. ............... 375/150; 375/148; 375/142; 375/144; 375/343; 370/335; 370/342

(58) Field of Classification Search .......... 375/142, 375/143, 144, 146–148, 150, 152, 343; 370/335, 370/342
See application file for complete search history.

(56) References Cited

U.S. PATENT DOCUMENTS 7,031,372 B2 *  4/2006  Tomerlin et al. ............ 375/146
7,280,623 B2 * 10/2007  Gupta et al. ................ 375/343

* cited by examiner

*Primary Examiner*—Phuong Phu
(74) *Attorney, Agent, or Firm*—Thomas, Kayden, Horstemeyer & Risley

(57) ABSTRACT

An apparatus for determining multipath correlations among a search range of input data, and a method thereof. The multipath searcher comprises a pseudo noise (PN) code generator, a correlator, and a data combiner. The PN code generator generates a first PN code corresponding to a first multipath component of the input data, postpones a first period based on the search range, then generates a second PN code corresponding to a second multipath component of the input data. The correlator is coupled to the PN code generator, and correlates the input data with the first PN code and the second PN code to produce a first correlation and a second correlation. The data combiner is coupled to the correlator, receives the first and the second correlations to determine a primary multipath component with a higher correlation thereto.

18 Claims, 12 Drawing Sheets

APPARATUS AND METHOD FOR REDUCING COMPLEXITY OF MATCHED FILTER

BACKGROUND OF THE INVENTION

1. Field of the Invention

The invention relates to signal correlation, and in particular to reducing complexity of matched filter for correlating multi-path interference in a receiver.

2. Description of the Related Art

A wireless communication signal suffers adverse multi-path effect during transmission when encountering obstructions, buildings, and geographical features such as mountains, to result in two or more multipath components of the transmitted signal reaching a receiver at different times, causing constructive and destructive interference, and phase shifting.

A spread spectrum system is designed to combat multipath interference by multiplying narrowband data by a wideband pseudo noise (PN) code in a spread spectrum transmitter to produce a wideband transmitted signal with spectrum of nearly the spectrum of the PN code. A spread spectrum receiver such as a RAKE receiver resolves multipath interference by correlating the incoming data with several timely shifted PN codes to detect multipath components, and adding the multipath components to yield an output data.

In spread spectrum systems such as Wideband Code Division Multiple Access (WCDMA) systems conforming to the UMTS/IMT-2000 (Universal Mobile Telecommunications System/International Mobile Telecommunications-2000) specifications, downlink (base stations to subscriber terminals) signals within a cell are modulated by a cell-specific scrambling code, also referred to as PN code, prior to transmission. Typically, orthogonal channelization codes, also known as spreading codes, are assigned to distinct physical channels transmitted in a cell, thus creating orthogonal downlink signals within the cell.

FIG. 1 is a block diagram of a conventional multipath searcher 1, comprising input data memory 100 and a plurality of correlators 110, 111, 112, 113, 114, 115, 116, 117, 118, and 119.

Data memory 100 receives and stores data $A_1, A_2, A_3, \ldots A_{n+10}$, represent a composite of multipath components, which are received CDMA data. Correlator 110 has correlation length n, time offset $\tau_0$, and receives pseudo noise (PN) code $B_1$ to $B_n$ to correlate data $A_1$ to $A_n$ to produce correlation output 120. Correlators 111 to 119 receive PN code $B_1$ to $B_n$ shifted by corresponding time offsets $\tau_1$ to $\tau_9$ to produce correlation outputs 121 to 129. Multipath searcher 1 compares correlation outputs 120 to 129 to identify the largest as the most significant multipath component of received signal. Multipath searcher 1 has a search range 130 ($\tau_9$-$\tau_0$), indicating a range of the time offsets to be searched.

Multipath searcher 1 shown in FIG. 1 employs many correlators to detect multipath components in input signal over a wide multipath search range, resulting in high circuit complexity and manufacturing cost. Thus a need exists for an apparatus and method to provide a multipath component that yields simple circuit implementation with low manufacturing cost.

BRIEF SUMMARY OF THE INVENTION

A detailed description is given in the following embodiments with reference to the accompanying drawings.

According to the invention, matched filter for determining multiple correlations among a search range of input data is provided. The multipath searcher comprises a pseudo noise (PN) code generator, and a correlation module. The PN code generator is configured to generate a plurality of PN code sequence, each PN code sequence comprises first and second PN codes spaced by a first period, and any two adjacent PN code sequences are separated by a second period. The correlation module comprises a number N of correlators and a sorting module. Each correlator is configured to correlate the input data with a corresponding sequence from the PN code sequences to produce correlations. The sorting module is configured to sort the correlations. the first period is (N+1) times of the second period According to another embodiment of the invention, an apparatus for determining multipath correlations among a search range of input data is also provided, comprising a pseudo noise (PN) code generator and a correlator coupled to the PN code generator. The pseudo noise (PN) code generator generates a first PN code corresponding to a first multipath component of the input data, postpones a first period based on the search range, then generates a second PN code corresponding to a second multipath component of the input data. The correlator is coupled to the PN code generator, correlates the input data with the first PN code and the second PN code to produce a first correlation and a second correlation, According to another embodiment of the invention, a method of searching a search range of time offsets of multipath components in input data comprises generating a first PN code corresponding to a first multipath component of the input data, postponing a first period based on the search range, generating a second PN code corresponding to a second multipath component of the input data, correlating the input data with the first PN code and the second PN code to produce a first correlation and a second correlation, and receiving the first and the second correlations to determine a primary multipath component with a higher correlation thereto.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Scope of the invention may include, but is not limited to, Code Division Multiple Access (CDMA), CDMA-2000 and wide band CDMA (WCDMA) cellular radiotelephone transmitters receiving spread spectrum signals, transmitters for global system for mobile communication (GSM), transmitters for third generation cellular systems (3G), orthogonal frequency division multiplexing (OFDM) transmitters, and the like.

Figure 2:
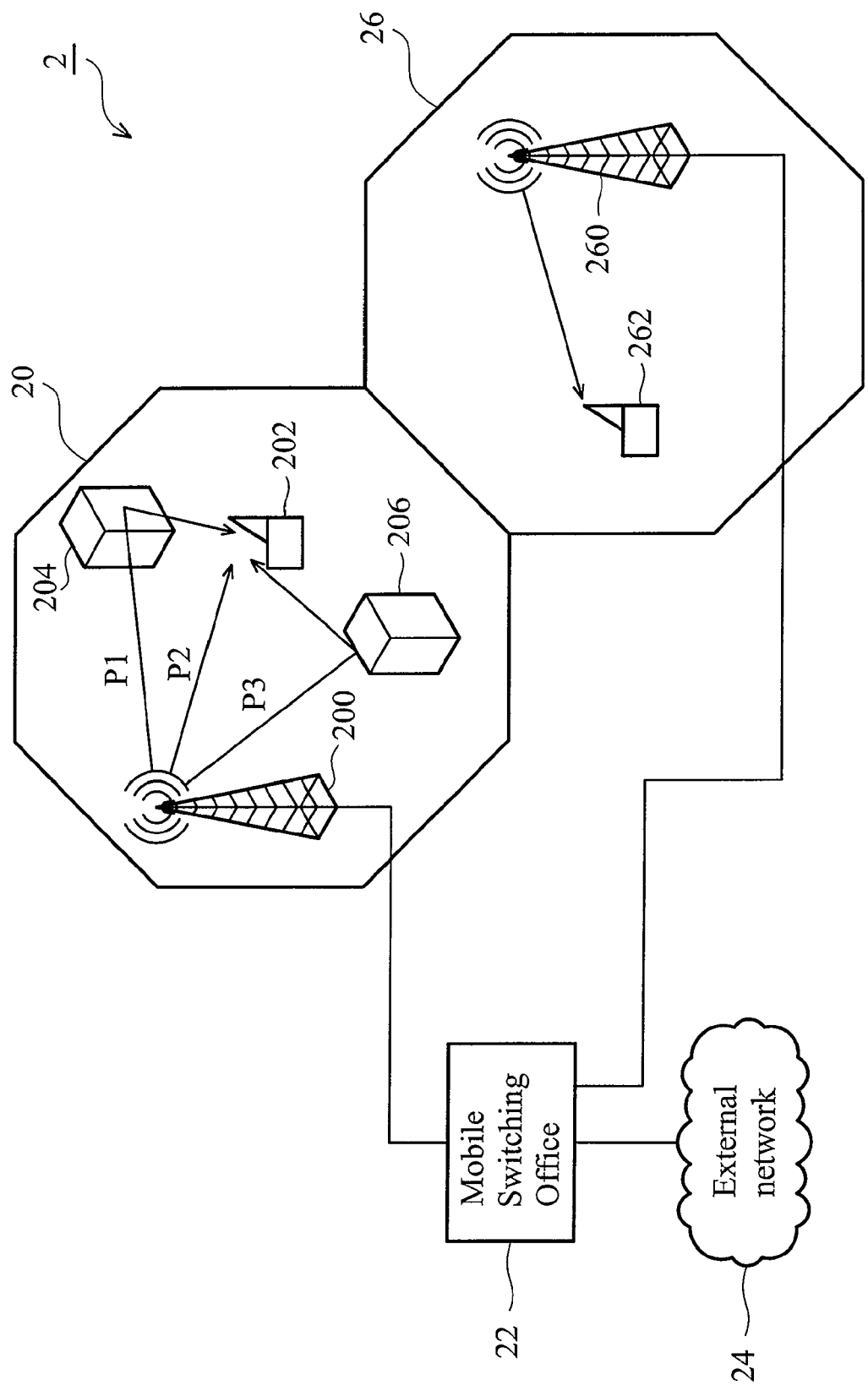
FIG. 2 is a block diagram of a conventional multipath searcher.

FIG. 2 illustrates multipath reception in a wireless communications system 2, comprising cell 20, Mobile Switching Office 22, external network 24, and cell 26. Cell 20 includes base station 200, mobile station 202, obstacle 204, obstacle 206, data path P1, P2, and P3. Base station 200 communicates to another base station 260 and external network 24 through Mobile Switching Office 22.

During communication to base station 200, mobile station 202 is subjected to multipath reception via several propagation paths depending on the transmission environment. FIG. 2 shows mobile station 202 receiving data associated with base station 200 through data paths P1, P2, and P3, where data path P1 arises from obstacle 204, data path P2 is a line of sight path, and data path P3 is from obstacle 106. Each propagation path has specific characteristics regarding signal attenuation, phase change, and signal arrival time. Obstacles 204 and 206 may be buildings, geographic features, or other obstructions reflecting radio signal of the data associated with base station 200.

Typically, only some of the propagation paths are significant in terms of signal strength from the perspective of the mobile station 202. Thus mobile station 202 receives data denoted as Dr from a radio channel, searches multipath components associated with paths P1, P2, and P3, and combines the multipath components based on corresponding multipath characteristic including signal attenuation, phase change, and signal arrival time. The operation of searching a multipath component in mobile station 202 is referred to as "data descrambling" or "correlation", where data Dr is correlated with a descrambling code specific to cell 20. If mobile station 202 indicates a high correlation between data Dr and the descrambling code, a multipath component may be found merely. By correlating data Dr with a number of descrambling codes shifted in time, mobile station 22 may find several multipath components arising from several data paths. The descrambling code may be a pseudo noise (PN) code produced by the generating polynomial in 3GPP (The 3rd Generation Partnership Project) standard, or any suitable generating polynomial.

Figure 3:
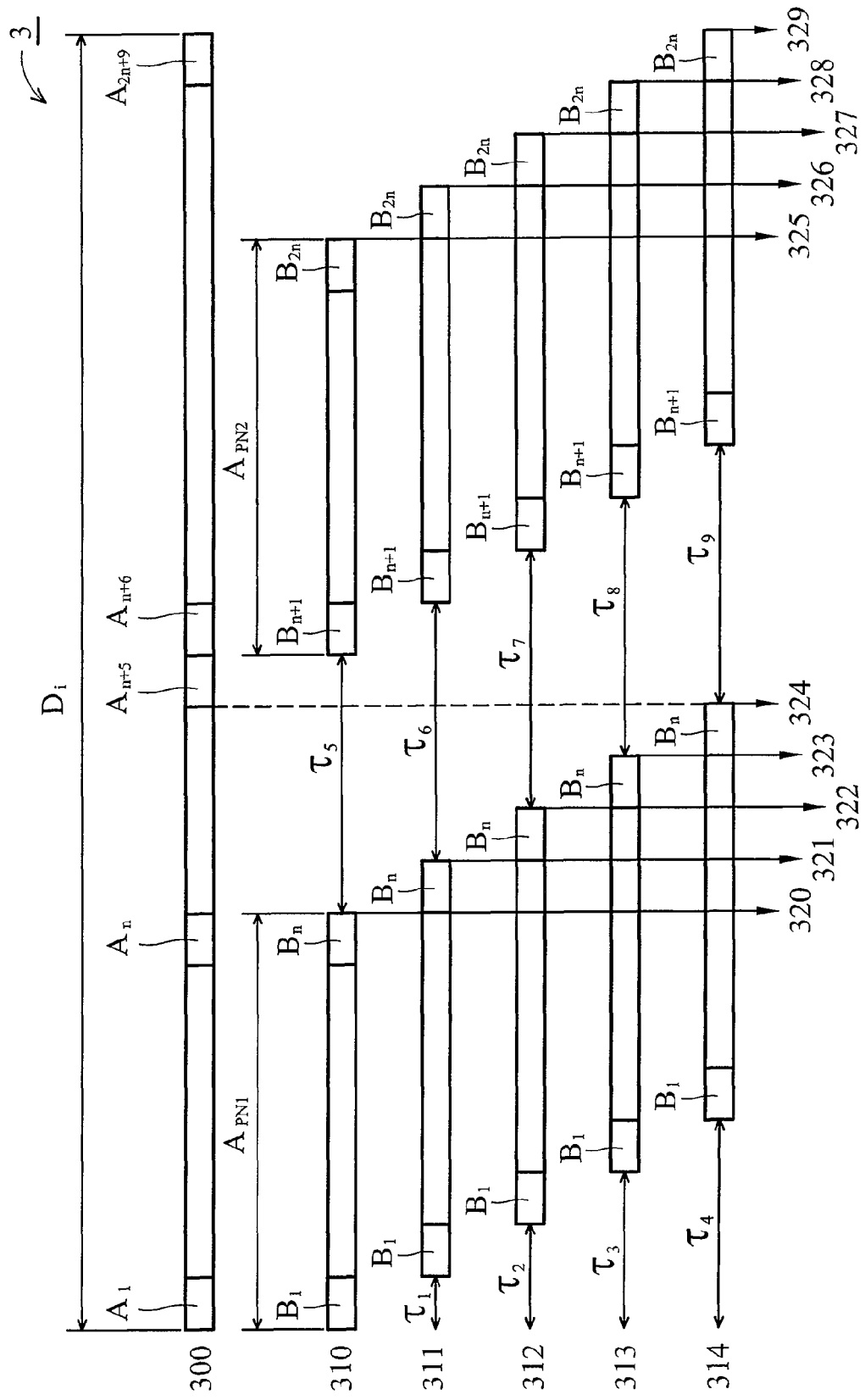
FIG. 3 is a block diagram of an exemplary multipath searcher of the invention.

FIG. 3 is a block diagram of an exemplary multipath searcher or so-called matched filter 3 of the invention, comprising data sequence or so-called data memory 300, and a plurality of correlators 310, 311, 312, 313, and 314. In one embodiment, Multipath searcher 3 is capable of searching multipath components in the input data with time offset of 9 data, i.e., a search range thereof is length of 9 data. Ordinary skilled in the art may understand the offset of 9 data is used to take example in one embodiment. Any offset with positive number would be complied with this invention. Similarly, the number of the plurality of correlators as well as the number of correlation products provided by each correlators could be varied in embodiments according to present invention. It depends on implementation considerations to determine those variable factors.

Input data sequence or data memory 300 is at least indexed by $A_1, \ldots, A_n, \ldots A_{2n+9}$, which may store a composite of multipath components modulated by a PN code prior to transmission over a radio channel. Input data Di stored in the data sequence 300 may be CDMA data comprising in-phase (I) and quadrature (Q) components in one embodiment. Correlator 310 receives first PN codes $D_{PN1}$ to correlate input data $A_1$ to $A_n$ and produce correlation output 320. After a first period $\tau_5$ (data $A_{n+1}$ to $A_{n+5}$), Correlator 310 further receives second PN codes $D_{PN2}$ to correlate incoming data $A_{n+6}$ to $A_{2n+5}$ for producing correlation output 325. The first codes $D_{PN1}$ having a correlation length of n are indexed from $B_1$ to $B_n$, And the second codes $D_{PN2}$ having the same correlation length of n are indexed from $B_{n+1}$, to $B_{2n}$. Correlator 310 produces two correlation outputs 320 and 325 for two time offsets, respectively, correlation output 320 corresponding to a multipath component with zero time offset (data $A_1$ to $A_n$), and correlation output 325 corresponding to a multipath component with $\tau_5$ time offset (data $A_{n+6}$ to $A_{2n+5}$). The duration of first period $\tau_5$ is subjected to a preset search distance within the search range, i.e., a time offset less than 9 bits. In the exemplary embodiment, first period $\tau_5$ searches for a time offset of 5 bits. Correlation output 320 for zero time offset and correlation output 325 for $\tau_5$ time offset may be compared to determine a larger correlation output thereof, indicating the corresponding data is a stronger multipath component.

Similar to Correlator 310, Correlator 311 stops for time offset $\tau_1$, receives first PN codes $D_{PN1}$ to correlate input data $A_2$ to $A_{n+1}$ and produce correlation output 321, postpones period $\tau_6$ for 5-bits time offset (data $A_{n+2}$ to $A_{n+6}$), then further receives second PN codes $D_{PN2}$ to correlate input data $A_{n+7}$ to $A_{2n+6}$ and produce correlation output 326. Correlator 311 produces correlation output 321 for 1-bit time offset, and correlation output 326 for 6-bits time offset. Likewise, correlator 312 produces correlation output 322 for 2-bits time offset, and correlation output 327 for 7-bits time offset, correlator 313 for correlation output 323 with 3-bits time offset, and correlation output 328 with 8-bits time offset, and correlator 314 for correlation output 324 with 4-bits time offset, and correlation output 329 with time offset of 9 data. In this embodiment, the correlations of each PN codes are equally spaced by a second period, which is the time offset $\tau_1$. For example, the output 321 provided by Correlator 311 is behind the second period of the output 320 provided by Correlator 310. Also, the output 326 provided by Correlator 311 is behind the second period of the output 325 provided by Correlator 310. In a example of this embodiment, the second period is a-bit distance as shown in the FIG. 3. However, Ordinary skilled in the art shall understand that the second period could be varied according to implementation considerations. Correlation outputs 320 to 329 represent time offsets of input data from 0 to 9 data, a data combiner (not shown) determines a multipath component and corresponding multipath characteristic for each time offset, adjusts the multipath component with corresponding multipath characteristic including signal attenuation, phase change, and signal arrival time, and combines the adjusted multipath components as output data.

Figure 1:
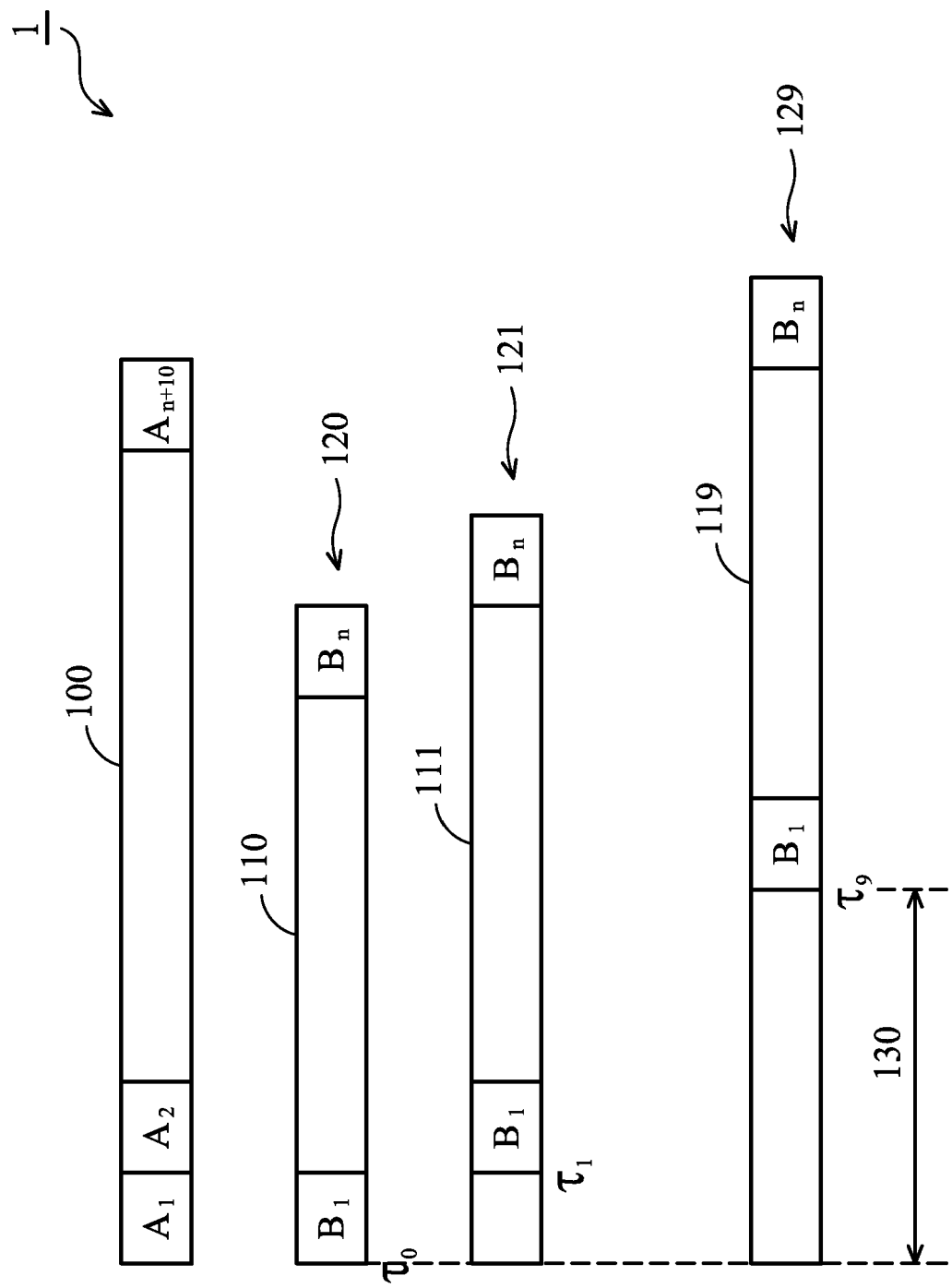
FIG. 1 illustrates multipath reception in a wireless communications system.

Compared to Multipath searcher 1 in FIG. 1, multipath searcher 3 reduces correlators hardware requirement by half, yielding an effective circuit design, and reduced manufacturing cost. In the embodiment shown in the FIG. 3, the required correlations are half folded. By increasing the number of correlations done by each correlator, the correlations could be finished by fewer correlators.

Figure 4:
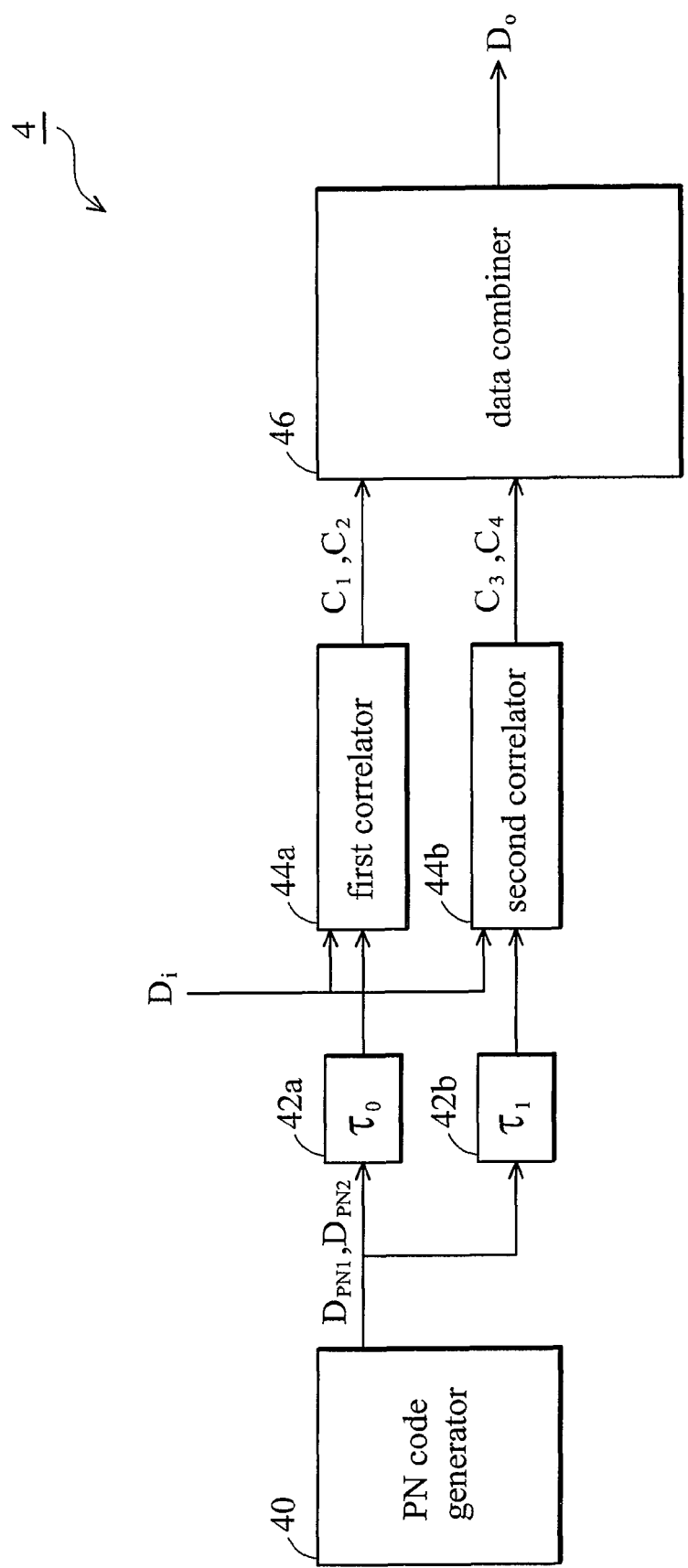
FIG. 4 is a block diagram of an exemplary spread spectrum receiver of the invention.

FIG. 4 is a block diagram of an exemplary spread spectrum receiver 4 of the invention, comprising PN code generator 40, first delay element 42a, first correlator 44a, second delay element 42b, second correlator 44b, and data combiner 46.

PN code generator 40 is coupled to first delay element 42a and second delay element 42b, and first correlator 44a and second correlator 44b, and both coupled to data combiner 46.

Spread spectrum receiver 4 receives input data Di as composite data of several multipath components and each of them differs from one another by a time offset, identifies the multipath components over a range of time offsets, referred to as a search range, and determines the stronger or strongest multipath component thereof for data demodulation. The identification of a particular multipath component is accomplished by correlating input data Di with a known PN code sequence having time offset τ to generate a correlation. A high correlation indicates that a multipath component in input data Di has been located. Input data Di may be spread spectrum data, CDMA data, or any data scrambled by known PN code prior to transmission. Time offset τ of each multipath component is measured in an increment of time known as PN chip, the time duration of one bit in a PN sequence, or approximately equivalent to the inverse of the occupied transmission bandwidth.

PN code generator 40 generates first PN codes $D_{PN1}$ corresponding to a first multipath component of input data Di, postpones a first period $\tau_{PN1}$ based on the search range, then generates second PN codes $D_{PN2}$ corresponding to a second multipath component of input data Di. PN code generator 40 multiplexes PN codes for two multipath components in time, such that the first and the second multipath components are sought in sequence. Both first PN code $D_{PN1}$ and second PN code $D_{PN2}$ have n bits of correlation length. First period $\tau_{PN1}$ equals a time offset of the second multipath component to be searched, and is less than the search range of time offsets corresponding to all multipath components. Although only two PN codes are generated in the embodiment, multiple PN codes may be generated by PN code generator 40, each separated by a corresponding postponed period $\tau_{PNn}$ for searching the nth multipath components.

Delay element 42a delays first PN codes $D_{PN1}$ and second PN codes $D_{PN2}$ by time $\tau_0$, then passes both to first correlator 44a to be correlated with input data Di and generate corresponding first correlation C1 and second correlation C2. First PN codes $D_{PN1}$ correlates for a multipath component with $\tau_0$ time offset in input data Di, while second PN codes $D_{PN2}$ correlates for a multipath component with $(\tau_0+\tau_{PN1})$ time offset. Time To may be zero for a multipath component with zero time offset, or any PN chip bit less than the search range.

Similarly, delay element 42b delays first PN codes $D_{PN1}$ and second PN codes $D_{PN2}$ by time $\tau_1$, correlator 44b correlates input data Di with delayed first PN code $D_{PN1}$ to generate correlation C3 for a multipath component with time offset $\tau_1$, and with delayed second PN code $D_{PN2}$ to produce correlation C4 for a multipath component with time offset $(\tau_1+\tau_{PN1})$.

Data combiner 46 receives first correlation C1 and second correlation C2 from correlator 44a, and third correlation C3 and fourth correlation C4 from correlator 44b, to determine a primary multipath component with the highest correlation thereto. In one embodiment, data combiner 46 outputs the multipath component with the highest correlation as output data Do. In another embodiment, data combiner 46 determines corresponding multipath characteristics for each multipath component with time offsets $\tau_0$, $(\tau_0+\tau_{PN1})$, $\tau_1$, and $(\tau_1+\tau_{PN1})$ respectively based on correlations C1, C2, C3, and C4, compensates each multipath component based on the corresponding multipath characteristics, and combines the compensated multipath components by maximal ratio combining (MRC) to generate output data Do. The multipath characteristics include signal attenuation, phase change, and signal arrival time.

Figure 5:
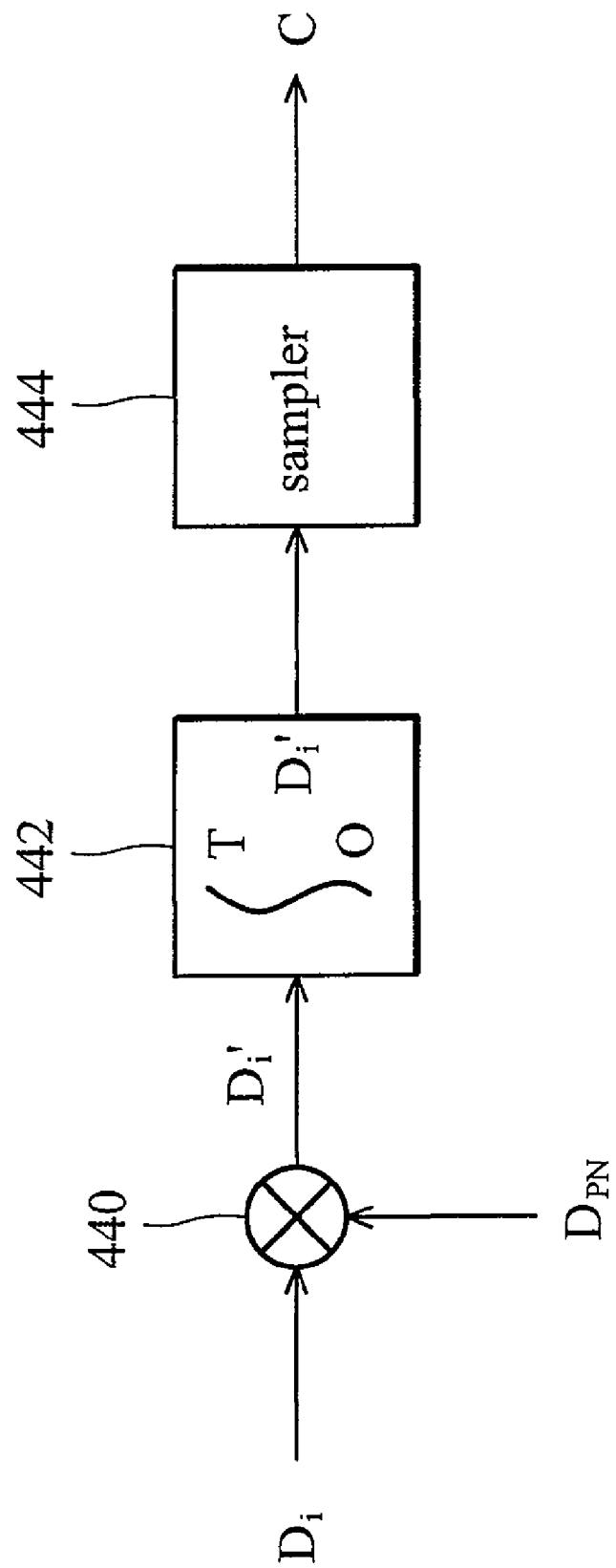
FIG. 5 is a block diagram of an exemplary correlator in FIG. 4.

FIG. 5 is a block diagram of an exemplary correlator in FIG. 4. The correlator comprises multiplier 440, integrator 442, and sampler 444. Multiplier 440 is coupled to integrator 442, and subsequently to sampler 444.

Input signal Di may be demodulated baseband data from a radio frequency (RF) signal, and PN code $D_{PN}$ may be produced by a generating polynomial in 3GPP specification. Both input signal Di and PN code $D_{PN}$ may be bipolar signals. Multiplier 440 multiplies input signal Di with PN code $D_{PN}$ to generate correlation Di'. Integrator 442 sums all correlations Di' over a correlation period T. When correlation period T reaches predetermined data length n, sampler 444 samples the summation of correlations Di' as correlation output C.

Figure 6:
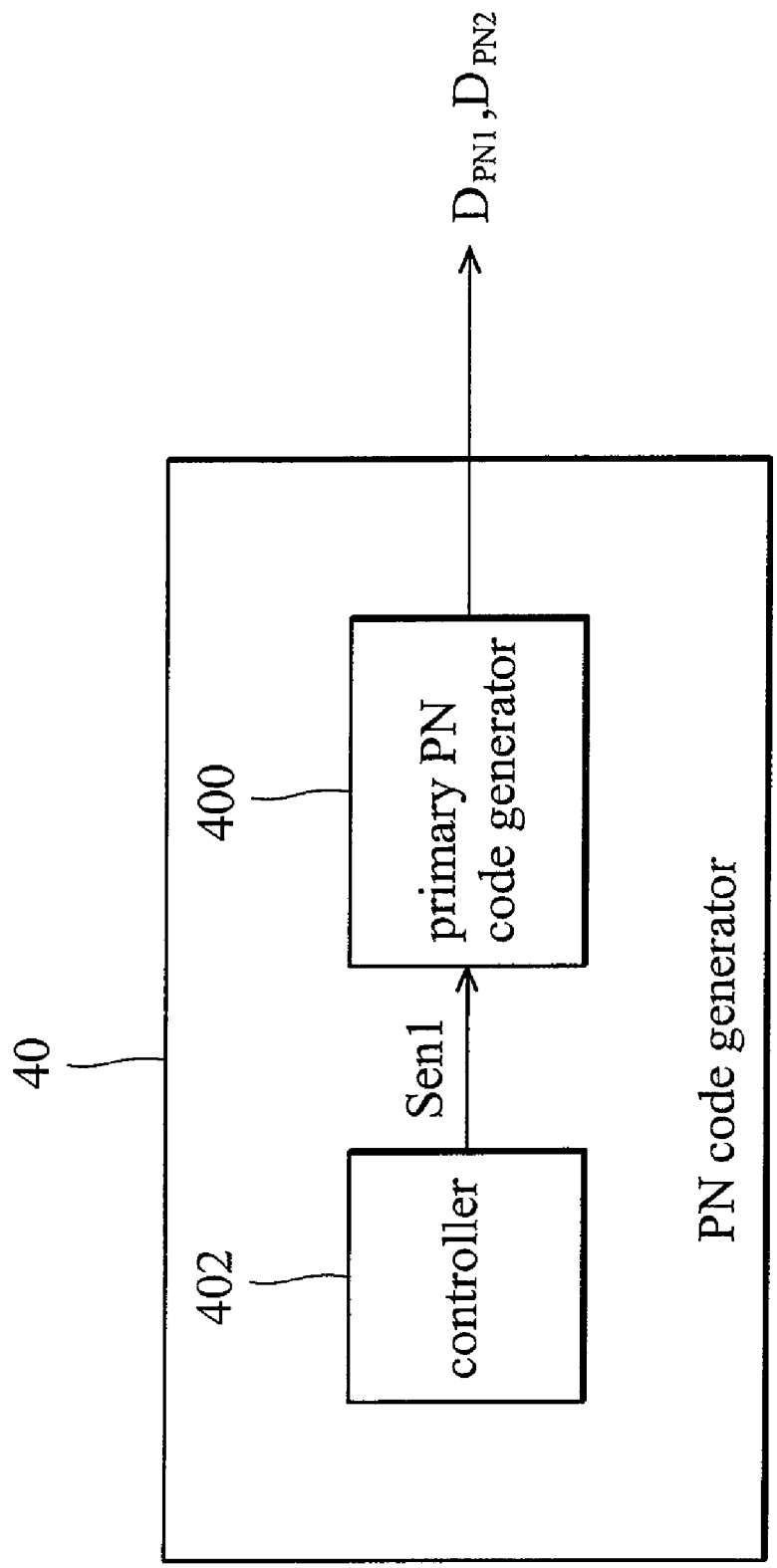
FIG. 6 is a block diagram of an exemplary PN code generator in FIG. 4.

FIG. 6 is a block diagram of an exemplary PN code generator in FIG. 4, comprising primary PN code generator 400 and controller 402, coupled to each other.

Primary PN code generator 400 generates first PN code $D_{PN1}$ corresponding to the first multipath component with zero time offset, and second PN code $D_{PN2}$ corresponding to the second multipath component with time offset $\tau_{PN1}$.

Controller 402 enables primary PN code generator 400 to generate first PN code $D_{PN1}$, disables primary PN code generator 400 to postpone first period $\tau_{PN1}$ based on the search range, then enables primary PN code generator 400 to second PN code $D_{PN2}$. Controller 402 enables and disables primary PN code generator 400 by enable signal $S_{en1}$. In one embodiment, enable signal $S_{en1}$ at logic "high" enables primary PN code generator 400, and at logic "low" disables it.

Figure 7:
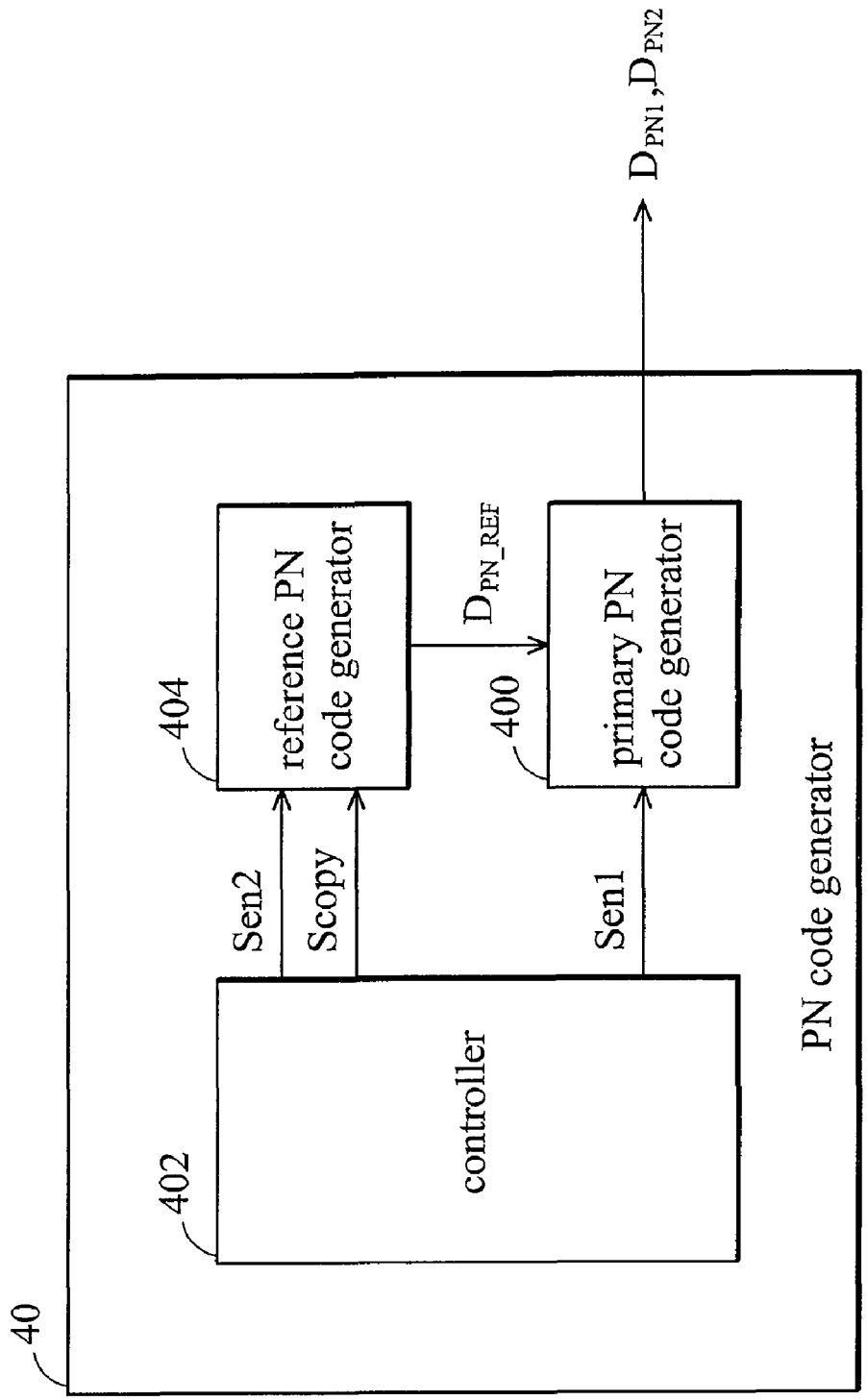
FIG. 7 is a block diagram of another exemplary PN code generator in FIG. 4.
Figure 8A:
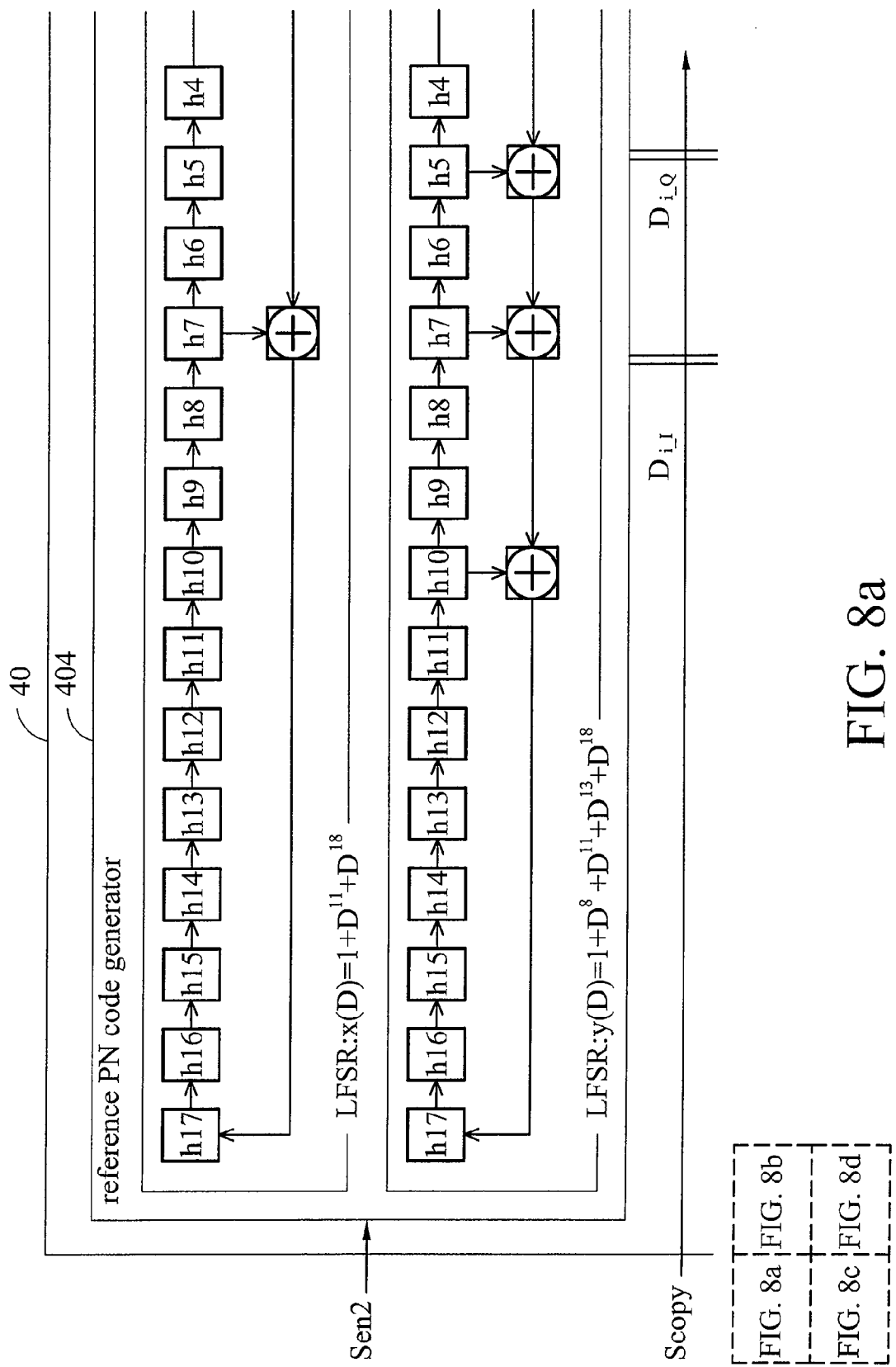
FIGS. 8a~d are schematic diagrams of a partial PN code generator in FIG. 6.
Figure 8B:
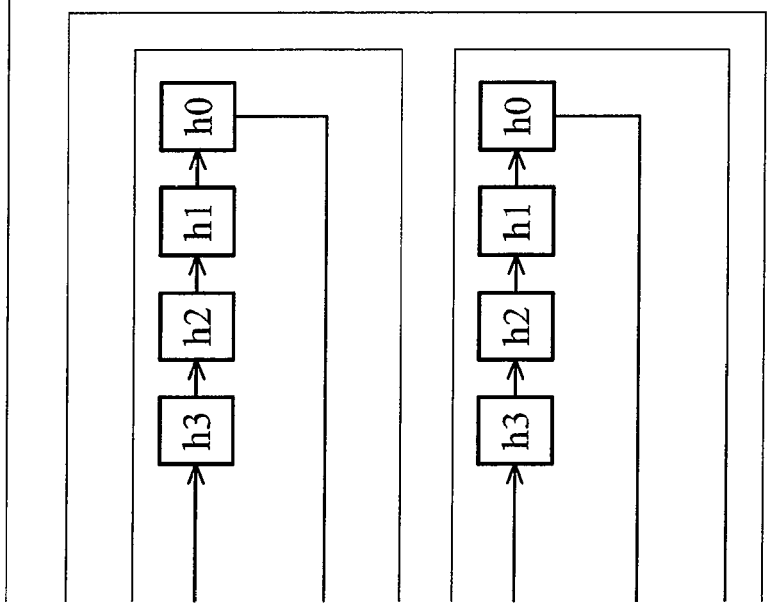
Figure 8C:
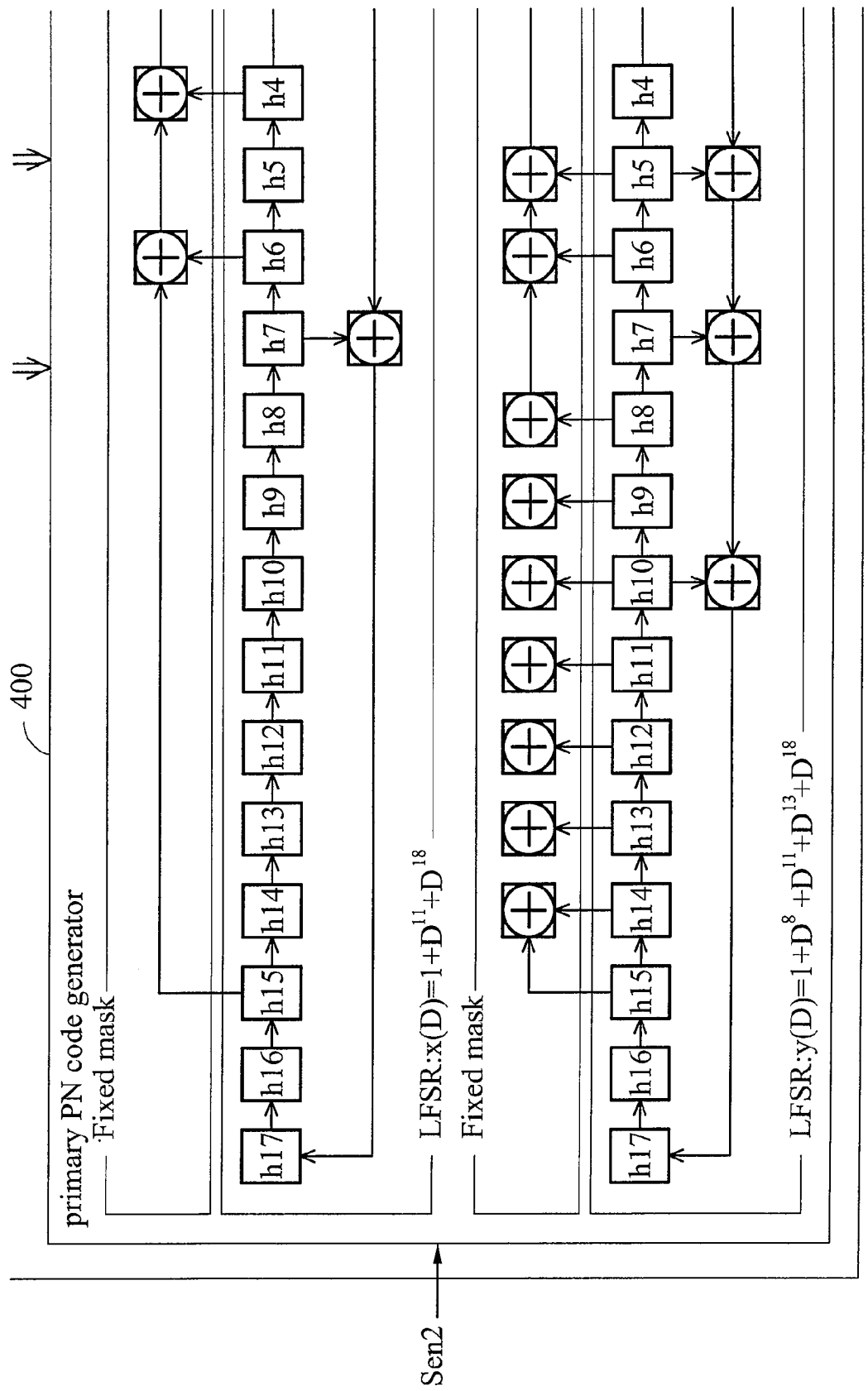
Figure 8D:
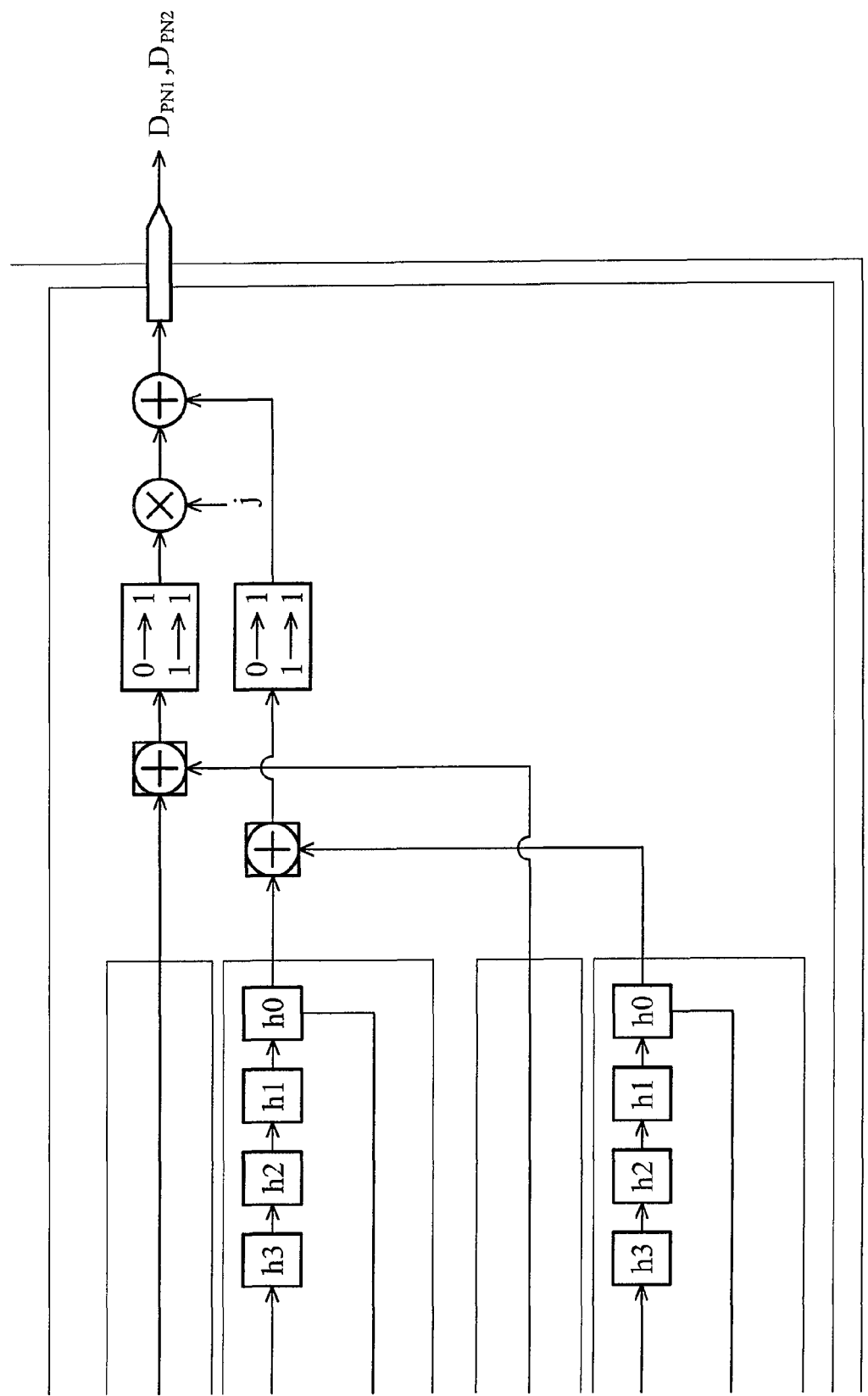

FIG. 7 is a block diagram of another exemplary PN code generator in FIG. 4, comprising primary PN code generator 400, controller 402 and reference PN code generator 404. Controller 402 is coupled to primary PN code generator 400 and reference PN code generator 404, coupled to each other.

PN code generator 400 sequentially generates first PN code $D_{PN1}$ and second PN code $D_{PN2}$ corresponding to a multipath component with time offset $\tau_{PN1}$. Reference PN code generator 404 generates free-running reference PN code $D_{PN\_REF}$ output to primary PN code generator 400.

Controller 402 controls enablement and disability of primary PN code generator 400 and reference PN code generator 404, where enablement may be logic "high" and disability may be logic "low". While controller 402 enables and disables primary PN code generator 400 to generate first PN code $D_{PN1}$, first period $\tau_{PN1}$ based on the search range, and second PN code $D_{PN2}$, it continuously enables reference PN code generator 404 to generate reference PN code $D_{PN\_REF}$, so that the PN code for multipath component with zero time offset is retained as a reference. Controller 402 copies reference PN code $D_{PN\_REF}$ to the primary PN code generator by copy signal $S_{copy}$, when it is desirable to restart a multipath search operation in spread spectrum receiver 4.

FIGS. 8a~d are schematic diagrams of a portion of the PN code generator in FIG. 6, comprising primary PN code generator 400 and reference PN code generator 404. Both primary PN code generator 400 and reference PN code generator 404 comprise Linear Feedback Shift Registers (LFSR) in a PN code generating polynomial in 3GPP specification. Primary PN code generator 400 is enabled and disabled by enable signal $S_{en1}$ to generate first PN code $D_{PN1}$ for zero time offset multipath component and second PN code $D_{PN2}$ for $\tau_{PN1}$ time offset. Reference PN code generator 404 is enabled by enable signal $S_{en2}$ to generate free-running reference PN code $D_{PN\_REF}$, copied to primary PN code generator 400 by copy signal $S_{copy}$ when another multipath search is restarted in spread spectrum receiver 4.

Figure 9:
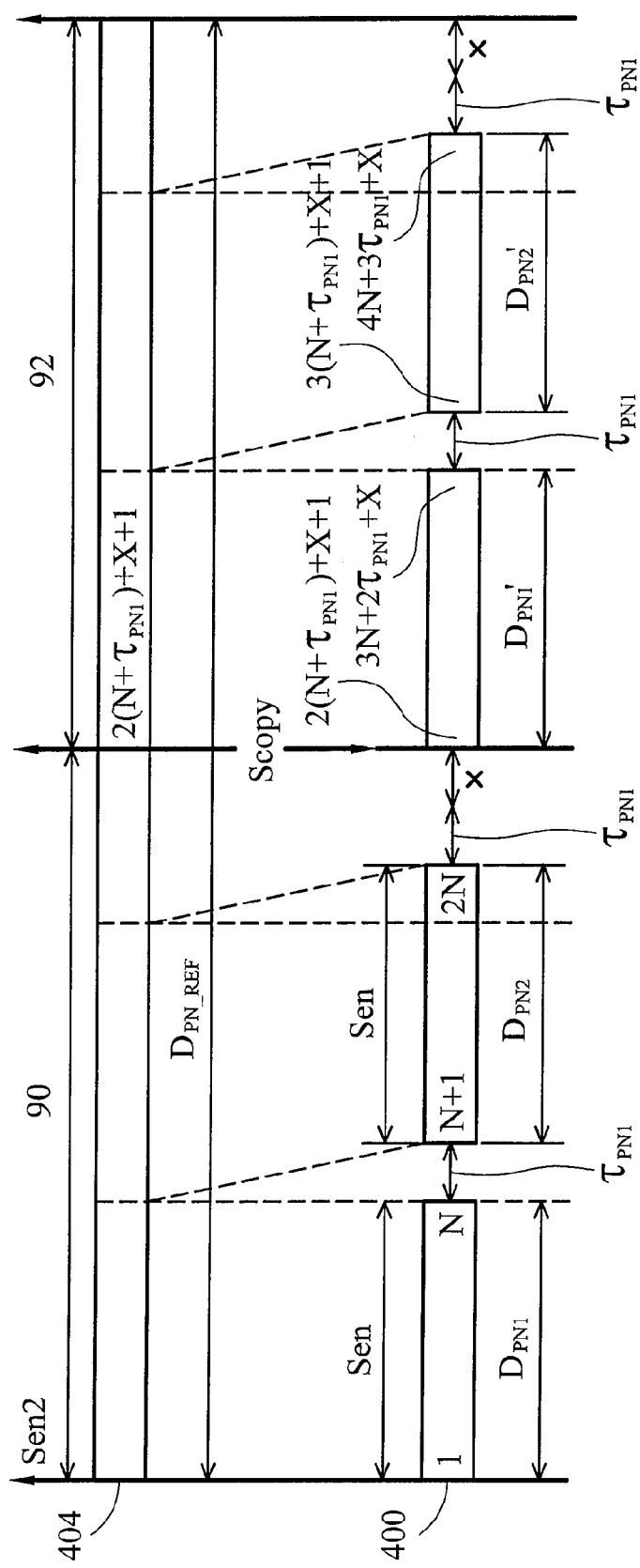
FIG. 9 is a timing diagram of selected signals of an exemplary multipath searcher in a spread spectrum receiver of the invention.

FIG. 9 is a timing diagram of selected signals of an exemplary multipath searcher in a spread spectrum receiver in the invention, incorporating the spread spectrum receiver 4 in FIG. 4 and the PN code generator 40 in FIG. 7, and comprising reference PN codes $D_{PN\_REF}$ of reference PN code generator 404, first PN codes $D_{PN1}$ and second PN codes $D_{PN2}$ from primary PN code generator 400, multipath search period 90, and multipath search period 92. The timing diagram in FIG. 9 shows two multipath search operations.

In the first multipath search of period 90, reference PN code generator 404 is enabled by signal $S_{en2}$ to generate free-running reference PN codes $D_{PN\_REF}$ throughout, reference PN code generator 404 is enabled by signal $S_{en1}$, to generate first PN code $D_{PN1}$ with N-bits correlation length, postponed by time offset $\tau_{PN1}$, then second PN code $D_{PN2}$ with N-bits correlation length. First PN code $D_{PN1}$ and second PN code $D_{PN2}$ are passed to correlators 44a and 44b in FIG. 4 to correlate input data Di. X is another time offset corresponding to channelization codes in 3GPP specification to be asserted prior to another round of multipath searching.

Upon the start of second multipath search in period 92, copy signal $S_{copy}$ is asserted to reference PN code generator 404 to copy reference PN code $D_{PN\_REF}$ at the index $(2(N+\tau_{PN1})+x+1)$ to first PN code $D_{PN1}'$. Primary PN code generator 400 is then enabled and disabled to generate first PN code $D_{PN1}'$ N-bits correlation length from the index $(2(N+\tau_{PN1})+x+1)$ to $(3N+2\tau_{PN1}+x)$, postponed by time offset $\tau_{PN1}$, then second PN code $D_{PN2}'$ with N-bits correlation length.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A matched filter for determining multiple correlations among a search range of input data, comprising:
    a pseudo noise (PN) code generator configured to generate a plurality of PN code sequence, each PN code sequence comprises at least a first and a second PN codes spaced by a first period, and any two adjacent PN code sequences are separated by a second period; and
    a correlation module comprising:
    a plurality of correlators, each correlator configured to correlate the input data with a corresponding sequence from the PN code sequences to produce correlations;
    a sorting module configured to sort the correlations; and
    wherein the first period is longer than a product of the second period and the number of the plurality of correlators.

2. The matched filter of claim 1, wherein the PN code generator comprises:
    a primary PN code generator for generating the first PN codes and the second PN codes; and
    a controller, coupled to the primary PN code generator, enabling the primary PN code generator to generate the first PN code, disabling the primary PN code generator to postpone the first period by the first period, and enabling the primary PN code generator to generate the second PN codes.

3. The matched filter of claim 2, wherein the PN code generator further comprises a reference PN code generator, coupled to the primary PN code generator and the controller, for generating a reference PN code, wherein the controller further enables the reference PN code generator to generate a reference PN code to the primary PN code generator for generating the first and second PN codes.

4. The matched filter of claim 1, wherein the first period is within the search range of the input data.

5. The matched filter of claim 1, wherein the input data comprises in-phase (I) and quadrature (Q) components.

6. The matched filter of claim 1, wherein the PN code generator further postpones for a period associated with channelization codes.

7. The matched filter of claim 1, wherein the PN code generator comprises Linear Feedback Shift Registers (LFSR) for generating polynomial in 3GPP specification.

8. An apparatus for determining multipath correlations among a search range of input data, comprising:
    a pseudo noise (PN) code generator generating a first and a second PN codes corresponding to a first and a second component of the input data spaced by a first period based on the search range, respectively, wherein the PN code generator comprises:
        a primary PN code generator generating the first PN code and the second PN code; and
        a controller, coupled to the primary PN code generator, enabling the primary PN code generator to generate the first PN codes, disabling the primary PN code generator to postpone the first period by the first period, and enabling the primary PN code generator to generate the second PN codes; and
    a correlator coupled to the PN code generator, correlating the input data with the first PN codes and the second PN codes to produce a first correlation and a second correlation.

9. The apparatus of claim 8, further comprising a data combiner coupled to the correlator, determining a primary component of the input data with a higher correlation from the first, and the second correlations.

10. The apparatus of claim 8, wherein the PN code generator further comprises a reference PN code generator coupled to the primary PN code generator and the controller, for generating a reference PN code, wherein the controller further enables the reference PN code generator to generate a reference PN code to the primary PN code generator for generating the first and second PN codes.

11. The apparatus of claim 8, wherein the first period is within a multipath search range for the input data.

12. The apparatus of claim 8, wherein the PN code generator further postpones for a period associated with channelization codes.

13. The apparatus of claim 8, further comprising:
    a time delay module, coupled to the first PN code generator, for delaying the first PN codes and the second PN codes to output a third PN codes and a fourth PN code with a second period behind the first and the second PN codes, respectively; and
    a second correlator, coupled to the time delay module, for correlating the input data with the third PN codes and the fourth PN code to generate a third correlation and a fourth correlation; and
    wherein the data combiner is further coupled to the second correlator, and determines the primary multipath component with the higher correlation among the first, the second, the third, and the fourth correlations.

14. The apparatus of claim 13, wherein the first period is longer than a multiple of the second period.

15. The apparatus of claim 8, wherein the PN code generator comprises Linear Feedback Shift Registers (LFSR) for generating polynomial in 3GPP specification.

16. A method of searching a search range of input data, comprising:

generating a first PN codes corresponding to a first component of the input data;

generating a second PN codes corresponding to a second component of the input data, wherein the second PN codes being delayed a first period behind the first PN codes;

correlating the input data with the first PN codes and the second PN codes to produce a first correlation and a second correlation;

generating a third PN codes which is delayed a second period behind the first PN codes;

generating a fourth PN codes which is delayed the second period behind the second PN codes; and correlating the input data with the third PN code and the fourth PN code to produce a third correlation and a fourth correlation; and determining a primary component from the first, second, third and fourth correlations.

17. The method of claim 16, wherein the generating the first and second PN codes is based on a reference PN codes.

18. The method of claim 16, wherein the first period is longer than a multiple of the second period.

* * * * *